(12) United States Patent
Selfridge

(10) Patent No.: US 11,628,955 B2
(45) Date of Patent: *Apr. 18, 2023

(54) AERIAL SYSTEM UTILIZING A TETHERED UNI-ROTOR NETWORK OF SATELLITE VEHICLES

(71) Applicant: Justin M Selfridge, Newport News, VA (US)

(72) Inventor: Justin M Selfridge, Newport News, VA (US)

(*) Notice: Subject to any disclaimer, the term of this patent is extended or adjusted under 35 U.S.C. 154(b) by 8 days.

This patent is subject to a terminal disclaimer.

(21) Appl. No.: 17/519,743

(22) Filed: Nov. 5, 2021

(65) Prior Publication Data

US 2022/0063841 A1 Mar. 3, 2022

Related U.S. Application Data

(63) Continuation-in-part of application No. 17/072,201, filed on Oct. 16, 2020, now Pat. No. 11,365,002, and a continuation-in-part of application No. 16/895,361, filed on Jun. 8, 2020, now abandoned, and a continuation-in-part of application No. 16/513,328, filed on Jul. 16, 2019, now abandoned, and a continuation-in-part of application No. 16/513,369, filed on Jul. 16, 2019, now Pat. No. 11,192,645, and a continuation-in-part of application No. 16/513,381,
(Continued)

(51) Int. Cl.
*B64C 39/02* (2023.01)
*B64G 1/10* (2006.01)
*B64G 1/24* (2006.01)

(52) U.S. Cl.
CPC .............. *B64G 1/10* (2013.01); *B64C 39/022* (2013.01); *B64C 39/024* (2013.01); *B64G 1/242* (2013.01)

(58) Field of Classification Search
CPC ......... B64C 39/022; B64C 37/02; B64D 1/22; B64D 2201/128
See application file for complete search history.

(56) References Cited

U.S. PATENT DOCUMENTS

| | | | | |
|---|---|---|---|---|
| 1,181,784 | A * | 5/1916 | McCurry | B64C 27/82 244/17.19 |
| 2,373,086 | A * | 4/1945 | Alabrune | B64D 1/02 244/137.1 |

(Continued)

*Primary Examiner* — Richard G Davis
(74) *Attorney, Agent, or Firm* — Eric Hanscom

(57) ABSTRACT

A tethered uni-rotor network of satellite vehicles, is made up of a central hub with multiple tethers radiating outward in a hub-and-spoke arrangement. Each tether attaches to a satellite vehicle; each having lifting airfoil surfaces, stabilizers, control surfaces, fuselages, and propulsion systems. The entire system operates in a persistent state of rotation, driven by the propulsion units on each satellite vehicle, so the airfoils generate lift which supports each satellite vehicle and a distributed portion of the weight of the central hub. As the system rotates, centrifugal forces pull each satellite vehicle outwards, which keeps each tether taught and applies tension across each of the lifting surfaces, thereby alleviating the bending moment common to fixed-wing aircraft. This approach reduces the weight within the structural members, utilizes higher aspect ratio wings to reduce induced drag, and employs thin-thickness high-camber airfoil profiles which achieve higher lift-to-drag ratios than standard practice.

20 Claims, 19 Drawing Sheets

Related U.S. Application Data filed on Jul. 16, 2019, now Pat. No. 11,203,427, and a continuation-in-part of application No. 15/430,475, filed on Feb. 11, 2017, now Pat. No. 10,807,709.

(56) References Cited

U.S. PATENT DOCUMENTS

| | | | | |
|---|---|---|---|---|
| 4,416,436 | A * | 11/1983 | Wilson, Jr. | B64D 1/22 244/137.1 |
| 5,074,489 | A * | 12/1991 | Gamzon | B64D 27/24 244/114 R |
| 5,395,070 | A * | 3/1995 | Stirbl | F24S 23/00 60/641.11 |
| 8,308,142 | B1 * | 11/2012 | Olson | B64D 3/00 244/137.1 |
| 2011/0084162 | A1 * | 4/2011 | Goossen | B64D 1/22 244/135 C |
| 2018/0002011 | A1 * | 1/2018 | McCullough | B64C 1/32 |

\* cited by examiner

AERIAL SYSTEM UTILIZING A TETHERED UNI-ROTOR NETWORK OF SATELLITE VEHICLES

CROSS REFERENCE TO RELATED APPLICATIONS

This application claims priority to U.S. application Nos:
Ser. No. 16/513,381 filed on Jul. 16, 2019 which is Pending claims the benefit of Ser. No. 15/430,475
Ser. No. 17/072,201 filed on Oct. 16, 2020 which is Pending claims the benefit of Ser. No. 15/430,475
Ser. No. 16/513,328 filed on Jul. 16, 2019 which is Pending claims the benefit of Ser. No. 15/430,475
Ser. No. 16/895,361 filed on Jun. 8, 2020 which is Pending claims the benefit of Ser. No. 15/430,475
Ser. No. 16/513,369 filed on Jul. 16, 2019 which is Pending claims the benefit of Ser. No. 15/430,475

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of aerial systems, and more specifically toward an aerial system utilizing a tethered uni-rotor network of satellite vehicles; which is, in particular embodiments, an aerial system that operates in a persistent state of rotation, such that the lifting surfaces are placed under tension from centrifugal forces; thereby, alleviating an adverse bending moment, reducing weight within structural members, increasing aspect ratio, and allowing for thin-thickness high-camber airfoil profiles with better lift-to-drag ratios; which yields a more aerodynamically efficient and low-power aircraft, without sacrificing a hover capability.

Fixed-wing aircraft, particularly gliders, are very efficient vehicles which attempt to minimize the amount of drag acting on the system. One of the primary means available to engineers to achieve this is to increase the aspect ratio of the wing, which is the ratio between the wingspan and the chord length. A high aspect ratio wing is desirable from an aerodynamic drag perspective, because it reduces the amount of induced drag; however, there are limitations with this approach. As the wing becomes more slender, with a higher aspect ratio, it becomes much more flexible and can experience bend and twist during flight. Furthermore, longer wings are prone to greater bending moments. Counteracting this increased moment at the root, which is the attachment point between the fuselage and wing, requires additional structural material to reinforce this connection point. Counteracting this increased moment across the lifting surface, requires thick airfoil profiles with larger drag coefficients. Finally, fixed-wing aircraft need a forward velocity to facilitate airflow over the airfoil to produce lift, so these systems cannot hover or takeoff vertically.

Unlike fixed-wing aircraft, helicopters have desirable vertical takeoff and landing (VTOL) and hovering capabilities. Consider a helicopter at rest on a tarmac. The rotor blades are generally so thin, that they bend and deflect under their own weight. However, these flimsy structures are capable of lifting a heavy vehicle once they are spinning, because they benefit from centrifugal forces which provide stiffening throughout the rotor element. The downside for such a rotor design, is it is not aerodynamically efficient. The rotors suffer from triangular span loading, meaning the outboard sections are primarily responsible for producing lift, while the inboard sections are quite ineffectual. Because a majority of the weight of the helicopter is concentrated at the center, the rotors must spin at very high angular rates, such that each rotor acts in a turbulent downwash field from its leading neighbor.

Thus, there has existed a long-felt need for an improved aerial system. One that can utilize higher aspect ratio wings without sacrificing structural robustness. One that reduces structural weight by alleviating a bending moment across slender lifting surfaces. One that can leverage thin-thickness high-camber airfoils for better lift-to-drag ratios, without introducing flexibility across the wing. One that can hover and translate, but also reduces drag by employing an ideal elliptic span load distribution without downwash field interactions. One that is stable and controllable in flight, can carry a payload, and offers desirable vertical takeoff and landing capabilities.

SUMMARY OF THE INVENTION

The current invention provides just such a solution with an aerial system utilizing a tethered uni-rotor network of satellite vehicles. The concept is made up of a central hub with multiple tethers radiating outward in a hub-and-spoke arrangement. Each tether attaches to a satellite vehicle; each having lifting airfoil surfaces, stabilizers, control surfaces, fuselages, and propulsion systems. The entire system operates in a persistent state of rotation, which is driven by the propulsion units on each satellite vehicle. As the satellite vehicles move through space, the airfoils generate lift which supports each satellite vehicle and a distributed portion of the weight of the central hub. As the system rotates, centrifugal forces pull each satellite vehicle outwards, which keeps each tether taught. The tethers are attached to the innermost portions of each lifting surface, and the energy storage mass is located at the outermost portion of each lifting surface, which applies tension across each of the lifting surfaces. By placing tension throughout the lifting surfaces, the tethered uni-rotor network is able to: alleviate the bending moment common to fixed-wing aircraft, reduce the weight within the structural members, utilize higher aspect ratio wings to reduce induced drag, and employ thin-thickness high-camber airfoil profiles which achieve higher lift-to-drag ratios than standard practice. These features yield a more aerodynamically efficient aircraft, which requires less power than fixed-wing embodiments, without sacrificing VTOL and hover capabilities.

A goal of a tethered uni-rotor network system, according to selected embodiments disclosed herein, is to utilize centrifugal stiffening inherent within a traditional helicopter configuration, to solve the engineering tradeoff between aerodynamic efficiency and structural robustness inherent within traditional fixed-wing aircraft designs. Furthermore, the tethered uni-rotor network system seeks to overcome the limitations of helicopters (high rotor angular rates, turbulent airflow over the rotor, triangular span loading, and downwash field interactions) and to overcome the limitations of high aspect ratio fixed-wing aircraft (flexibility, bending moments, structural weight at the wing root, and thick airfoil profiles).

It is an object of the invention to provide an aerial system with improved aerodynamic efficiency by reducing aerodynamic drag.

It is additionally an object of the invention to provide an aerial system with increased structural rigidity by leveraging centrifugal stiffening.

It is an object of the invention to place the energy storage masses at the outermost radius thereby slowing the angular rate of the aerial system.

It is an object of the invention to attach each tether to the innermost portion of each satellite vehicle to place each of the lifting surfaces under tension.

It is an object of the invention to provide an aerial system that uses less power and operates for longer periods of time than comparable sized fixed-wing aircraft.

It is also an object of the invention to provide an aerial system that operates at high altitude for an extended period of time.

It is a further object of this invention to provide a solar-powered aerial system, which consumes sufficiently low levels of energy, such that it may remain airborne for an indefinite period of time.

As used herein, a "satellite vehicle" shall describe the component that contains the fuselages, winged lifting surfaces, stabilizers, control surfaces, and propulsion units.

As used herein, a "tether" shall describe the flexible cable which connects a satellite vehicle to the central hub, and which maintains tension forces between the two.

As used herein, a "tether arm" shall describe a satellite vehicle connected to its respective tether.

As used herein, the "central hub" shall describe the centermost component to which all the tether arms are permanently secured.

The most general embodiment of the current disclosure is an aerial system comprising a central hub, which connects to multiple tethers in a hub-and-spoke arrangement. Each tether radiates outward away from the central hub, and attaches to a satellite vehicle. Each satellite vehicle comprises several components, including: fuselages, which house avionics components; winged airfoil sections, which produce lift; structural members, which provide rigidity for the wing and maintain the shape of the airfoil profile; energy storage mass, which provides the fuel consumed by the system; propulsion units, which provide thrust to counteract aerodynamic drag; stabilizer surfaces, which help the satellite vehicle mitigate external disturbances; and control surfaces, which maintain the desired trajectory of the satellite. The tether for each tether arm is a thin filament cable which transmits tension forces between the central hub and its respective satellite vehicle. The central hub has no active controls, so the tethered uni-rotor network system uses coordinated flight maneuvers between each of the satellite vehicles to impart forces on the central hub via tension from each of the tethers.

A preferred embodiment for the number of tether arms is four. This allows for the easiest control methodology and permits redundancy in the event a tether arm becomes disabled. However, other numbers of tether arms are permissible. Two tether arms are the minimum number needed to counter balance the rotation, but this does not completely stabilize the central hub, which is free to swing like a hammock. As such two tether arms should be reserved for times when the other tether arms have become disabled, or for applications when the central hub is constrained in other ways, such as within an airborne wind energy device. Three tether arms is the minimum number needed to completely stabilize the central hub, and offers the most ideal aerodynamic properties from centrifugal stiffening, because it has the most concentrated mass in each tether arm. However, an odd number of tether arms is more difficult to control, because pairs of tether arms are not directly opposing one another, and it does not offer any redundancy in the event of a tether arm failure. Four tether arms is a preferred embodiment because the control law is easier to implement with pairs of tether arms directly opposing one another, and it offers a redundancy in the event of a failure; albeit with a slight compromise on centrifugal stiffening when compared to three tether arms. Any number of tether arms greater than or equal to five is also conceivable, and can offer increased redundancy and robustness. However, with each additional tether arm the amount of beneficial centrifugal stiffening decreases and the complexity of the system increases, so using more tether arms represents a standard engineering tradeoff.

A preferred embodiment for the attachment point between each tether and its respective satellite vehicle, is placed on the airfoil camber line at the quarter chord of the innermost wingtip. To fully leverage centrifugal stiffening, the attachment point needs to be at an inboard location on the wing, but adjusting the camber line and quarter chord positions may be used to facilitate trimming. For instance, attachment points fore or aft will adjust the relative yaw heading with respect to the rotating frame of the central hub, and attachments points higher or lower than the camber line will adjust the trimmed roll attitude of the satellite vehicle wing.

A preferred embodiment for the wing surface is a single, flat, horizontal, mono-wing. This is expected to be the simplest configuration which provides the greatest benefit to the tethered uni-rotor network system. However, alternative configurations are acceptable. Multiple lifting surfaces in various locations may provide enhanced stabilization or controllability for the entire system.

A preferred embodiment for the placement of the energy storage mass is located at the outermost wingtip of each satellite vehicle, because this location: (1) places the entire length of wing under tension, and (2) minimizes the rotation rate of the tethered uni-rotor network system. However, alternative locations have merit. Housing the energy storage mass within the wing structure, slightly compromises the amount of tension across the wingspan, but provides a more uniform wing loading distribution. Finally, as with nearly all aircraft, some compromises might exist which need to adjust the location of the center of gravity, to accommodate other components, such as landing gear placement or control surface effectiveness.

Each satellite vehicle has a structural member, which maintains the shape and rigidity of the airfoil, and is responsible for supporting the tension across the wing. A preferred embodiment for the structural member is a carbon fiber composite skin, which is bonded to an inner foam core with the desired airfoil profile. Other materials may also be used, such as: fiberglass, aramid fibers, aluminum, honeycomb core, or wood, to name a few. This approach minimizes manufacturing complexity, and places the structural material at a maximum distance away from the neutral axis. However, other embodiments may be necessary, especially when placing the energy storage mass within the wing structure. In such cases, more traditional wing designs may be employed; such as: spar beams, spar boxes, I-beams, airfoil ribs, D-box leading edge, and/or tapered trailing edges.

A preferred embodiment utilizes a thin-thickness and high-camber airfoil profile, which produces lift at a zero angle-of-attack. The pressure distribution on such an airfoil maintains laminar flow while operating at a low Reynolds number, and provides a better lift-to-drag ratio than more commonly used airfoils. Alternative embodiments, especially those that house the energy storage mass within the wing, may require profiles with greater spar depth or a lesser degree of camber.

A preferred embodiment for the type of propulsion unit is a brushless electric motor with a fixed pitch propeller. This is the simplest configuration which reduces mechanical complexity. However, other embodiments are allowable. Alternative fuel sources may be used to power the aircraft, such as heavy fuel, fuel cells, or hybrid systems. Variable pitch propellers could replace or compliment the fixed pitch propellers, which would offer a faster thrust dynamic response. Alternatively, propeller systems could be omitted, and other mechanisms used in its place, such as rocket or jet propulsion.

A preferred embodiment for the number of propulsion units per satellite vehicle is one, because it reduces the amount of mechanical complexity. However, utilizing additional propulsion units offers several advantages. Any number greater than one offers the possibility of a redundant system in the event of a failure. Furthermore, pairs of propulsion units may be used to implement differential thrust, which is a control technique to induce a moment on the satellite vehicle, and eliminate the need for a control surface. Finally, placing a multitude of propulsion units on the leading edge of the airfoil has aerodynamic benefits, because forced air over the wing helps maintain laminar flow.

A preferred embodiment rigidly mounts the propulsion unit with respect to each satellite vehicle, for mechanical simplicity and to reduce the controller complexity. However, an alternative controls methodology may utilize propulsion units that articulate/rotate with respect to the rigid body. Adjusting the orientation of a propulsion unit, changes the direction of its thrust vector, which induces a moment on the satellite vehicle. This applied moment can be used as a control input, which would eliminate the need for its respective control surface, thereby reducing weight and drag on the system.

A preferred embodiment for the placement of fuselages, propulsion units, stabilizers, and control surfaces is as follows. A single fuselage is located at the outboard portion of the wingtip. A single propulsion unit is located on the nose of the fuselage. A boom extending aft of the fuselage utilizes a single horizontal stabilizer with control surface. This is the minimal hardware arrangement, such that propulsion overcomes drag, and the system has active pitch stabilization and control. Alternative embodiments permit additional modes of control or means of reducing the number of control surfaces. For instance, a vertical control surface mounted on the fuselage and aligned with the wing, would adjust the magnitude of the radial tension imparted on its tether. Similarly, a horizontal control surface mounted on the fuselage and aligned with the wing, would adjust the relative vertical displacement of the satellite vehicle with respect to the central hub. Both can be used to fine tune the coordinated flight maneuvers which impart forces on the passive central hub via the tension from their tethers. Finally, utilizing angled stabilizers and control surfaces requires a more complicated control mixing strategy, but may be used to minimize the number of control surfaces required.

Thus, it has been outlined, rather broadly, the more important features of the invention, in order that the detailed description thereof may be better understood, and in order that the present contribution to the art may be better appreciated. While the previous description outlined some preferred embodiments, and summarized some notable alternative configurations, these descriptions are for illustrative purposes only, and do not limit the scope of the disclosed invention. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention; and together with the description, serve to explain the principles of this invention.

DETAILED DESCRIPTION OF THE INVENTION

Figure 1:
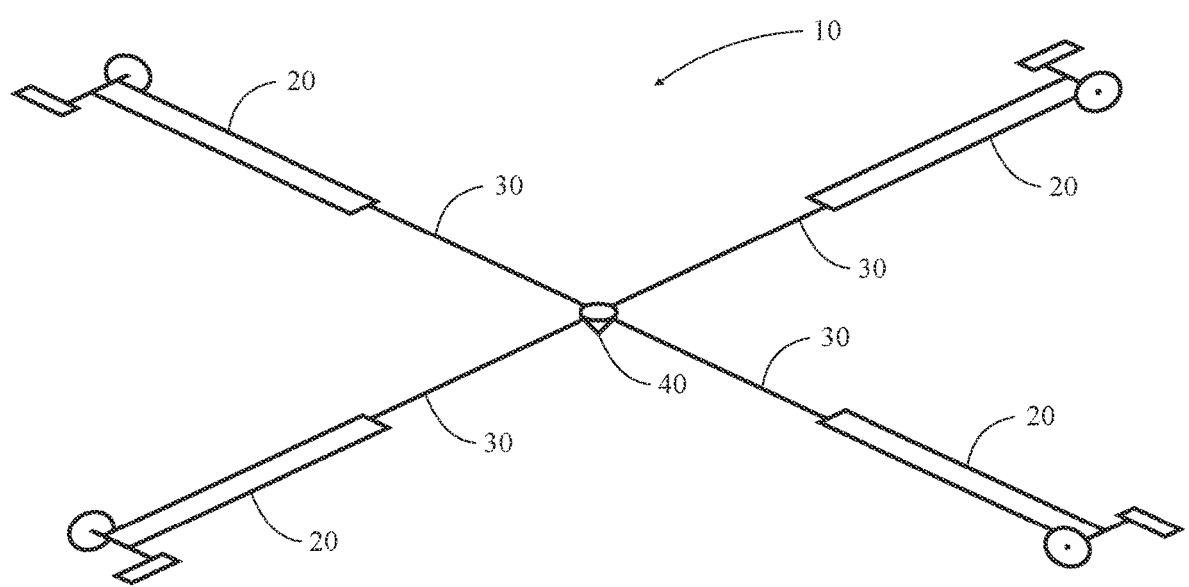
FIG. 1 includes a perspective, side, and top view of a tethered uni-rotor network aircraft according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

According to selected embodiments, the tethered unirotor network is an aerial system that has a central hub, with multiple tethers that radiate outwards in a hub-and spoke arrangement, where the outboard portion of each tether attaches to the inboard portion of a satellite vehicle. Each satellite vehicle resembles a small aircraft system which includes: a fuselages containing avionic components, an airfoil lifting section, propulsion units, stabilizers, and control surfaces. Embodiments of the aerial system herein, operate in a perpetual state of rotation during flight. The rotation is driven by the propulsion units on each of the satellite vehicle. As the system spins, centrifugal forces keep the tethers taught, and places the structural members under tension. Furthermore, as the system spins, each satellite vehicle moves through the air, which generates lift on the winged airfoil sections. The amount of lift generated counteracts the weight of the satellite vehicle and a distributed portion of the weight of the central hub.

FIG. 1A is a perspective view, FIG. 1B is a side view, and FIG. 1C is a top view, of a tethered uni-rotor network aircraft according to selected embodiments of the current disclosure. The tethered uni-rotor network aircraft 10 includes multiple satellite vehicles 20, in this view four satellite vehicles 20, which are each connected to the central hub 30 via their own tether 40. The satellite vehicles 20 rotate around the central hub 30.

FIG. 2A is a perspective view, FIG. 2B is a front view, FIG. 2C is a side view, and FIG. 2D is a top view, of a satellite vehicle according to selected embodiments of the current disclosure. The satellite vehicle 20 has fuselages 21, in this embodiment there is one, which has a propulsion unit 22, in this embodiment it is a propeller, to generate thrust. A lifting surface 23, such as a wing, provides lift, which is a generally upward force. A tail boom 24, extending aft of the fuselage, secures a horizontal stabilizer with an elevator 25, which provides pitch control for the satellite vehicle 20. As shown in this figure, the satellite vehicle employs an asymmetrical mono-wing design, with a prop located on the outboard wingtip, and control surfaces located within the prop wash. As will be appreciated by those skilled in the art, other positions, locations, orientations, or geometries of the lifting surfaces, stabilizers, control surfaces, or propulsion units, may be used to control the satellite vehicles.

Figure 2:
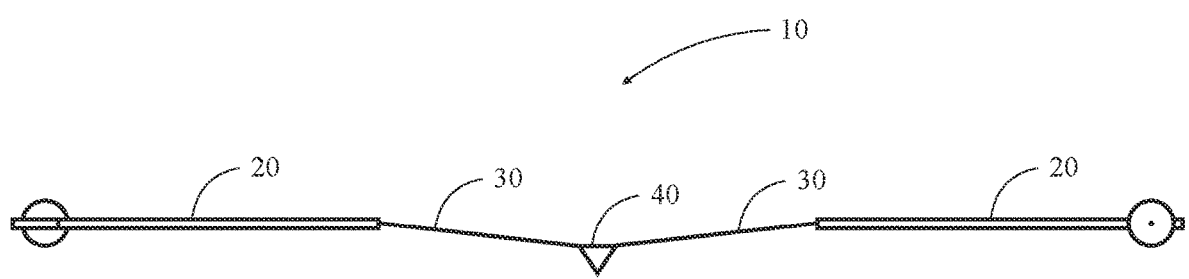
FIG. 2 is a perspective, front, side, and top view of a satellite vehicle according to selected embodiments of the current disclosure.

The satellite vehicle configuration depicted within FIG. 2 is considered to be the ideal embodiment of the current disclosure. A single propulsion unit on each satellite system is the minimum number needed to overcome aerodynamic drag. Mounting the propulsion unit on the outboard wingtip provides the most centrifugal benefit, but inboard or middle placements are conceivable as well. Since each tether arm is subjected to centrifugal force, the roll and yaw axes of each satellite vehicle are asymptotically stable. Thus, a single horizontal stabilizer with elevator control surface, is the bare minimum needed to provide active pitch control and stabilization. Later paragraphs will outline how additional stabilizers and control surfaces may be utilized within the design.

Figure 3:
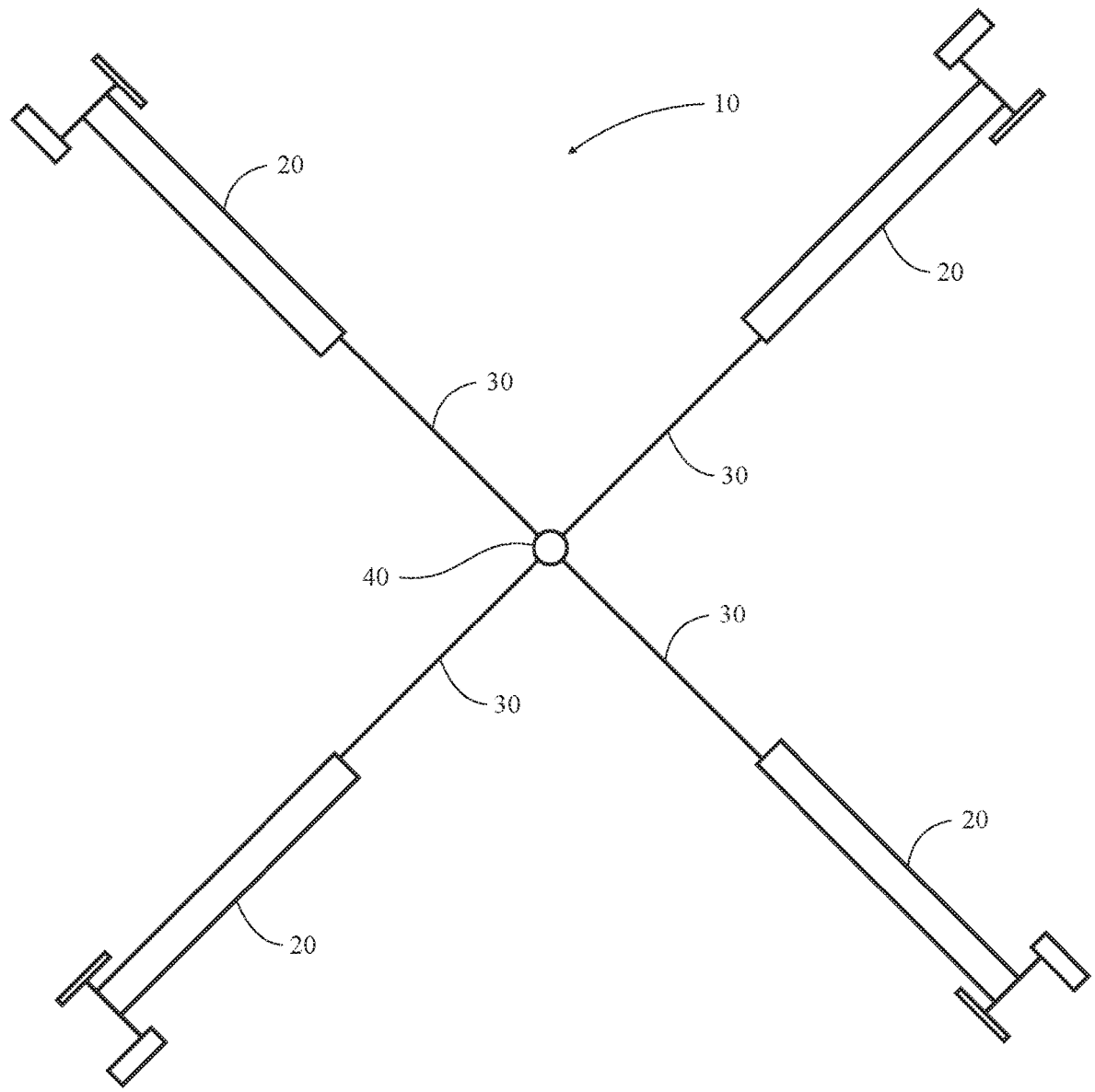
FIG. 3 is an illustration which shows a front view of a traditional fixed-wing aircraft, and its resultant bending moment across the wing.

FIG. 3 is a diagram which illustrates the bending moment within traditional fixed-wing aircraft. A traditional aircraft 50 has a weight force 51 located at the center of gravity, and a lift force 52 distributed across its wing. These forces tend to deflect the wing and its structural members, which puts the bottom surface under tension 54 while the top surface is subjected to compression 55. Many materials, especially those utilizing carbon fiber composites, perform significantly better under tension than under compression. As such, the wing root 56, which is the connection point between the wing and the fuselage, requires additional structural material, and the wing profile 57 must have a suitable thickness to overcome this compression force arising from the bending moment.

Figure 4:
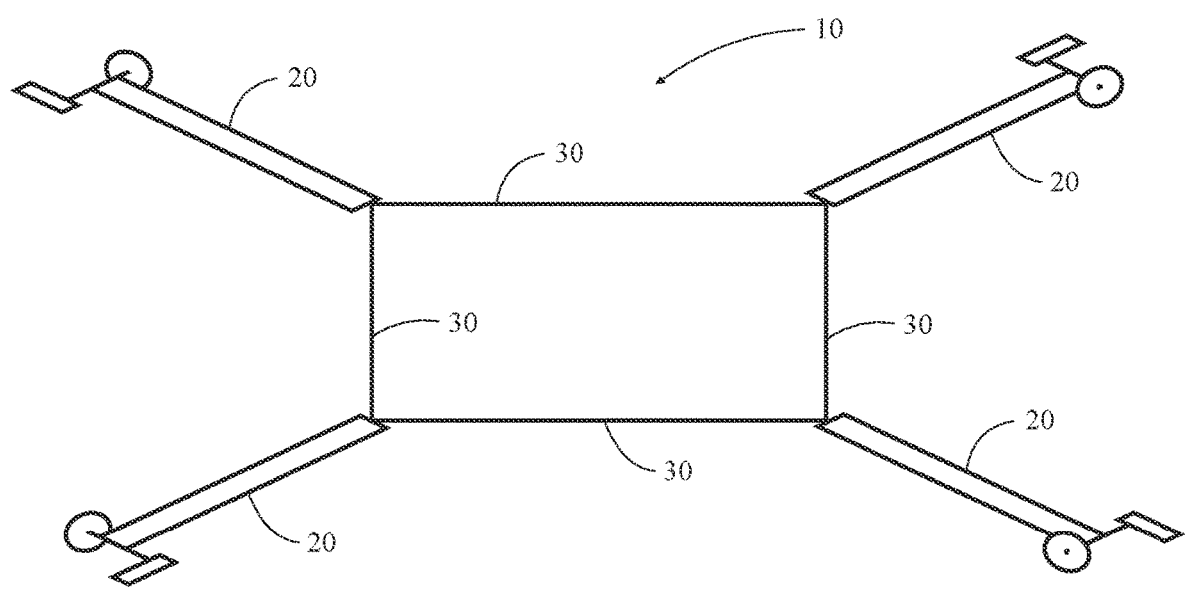
FIG. 4 is an illustration which shows how centrifugal stiffening alleviates a bending moment across the structural member of a wing according to selected embodiments of the current disclosure.

FIG. 4 is a diagram which illustrates how the tethered uni-rotor network system, disclosed herein, utilizes the same beneficial centrifugal stiffening as a traditional helicopter rotor, to overcome the structural problems inherent within fixed-wing aircraft. Inboard sections are comprised of a thin tether filament, which eliminates an under utilized structure from a helicopter design. Because the satellite wingtip is free to pivot about the tether connection point 64, there is no detrimental bending moment which is typically found at the wing root of fixed-wing aircraft designs. Weight 61 still acts downward, and the lift force 62 is still distributed across the wing 23, but with the tethered uni-rotor network approach, there is also centrifugal force putting the wing under tension. As such, the centrifugal stiffening within each satellite vehicle can offset the compression loads and place the entire structural member under tension. This reduces the total mass of the structural member, allows for much greater aspect ratios than can be attained by a traditional tube-and-wing style aircraft, and permits thin-thickness, high-camber airfoils 67 with much better lift-to-drag ratios than standard practice.

Figure 5:
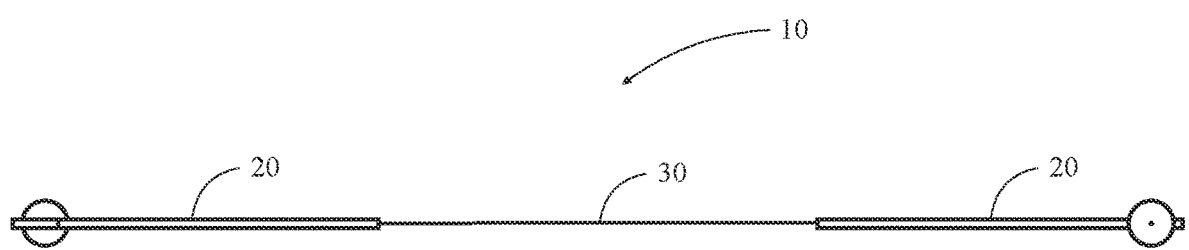
FIG. 5 is a diagram showing the interacting forces transmitted by the tether between the satellite vehicle and the passive central hub according to selected embodiments of the current disclosure.

FIG. 5 is a diagram showing the interacting forces transmitted through the tether between the satellite vehicle and the central hub according to selected embodiments of the current disclosure. As the system operates in a persistent state of rotation, three components of a force vector act at the connection point on the central hub. A vertical force counteracts the weight of the central hub, a lateral force arises from the aerodynamic drag pulling on the tether, and a radial force arises from the centrifugal forces present from the rotation of the system. These three forces are present even during the hover operation of the tethered uni-rotor network system. However, altering the relative position of a satellite vehicle with respect to the central hub, will also alter the magnitude of the component forces acting on the central hub anchor point. As the satellite vehicle 20 moves away from the central hub 30, the satellite vehicle 20 pulls on the tether 40, which in turn increases the magnitude of the radial force on the central hub 30. Similarly, moving inward decreases the magnitude of the vector. As the satellite vehicle 20 moves upward with respect to the central hub 30, the satellite vehicle 20 pulls upward on the tether 40, which in turn increases the magnitude of the vertical force on the central hub 30. Similarly, moving downward decreases the magnitude of the vector. As the satellite vehicle 20 moves forward with respect to the central hub 30, the satellite vehicle 20 pulls forward on the tether 40, which in turn increases the magnitude of the lateral force on the central hub 30. Similarly, moving backward decreases the magnitude of the vector. As long as there is tension within the tether, these forces are transferred to the hub, subject to drag and other frictional losses. Although the central hub has no active controls of its own, navigating the tethered uni-rotor network can be accomplished through coordinated flight maneuvers, which impart the desired forces on the central hub, such that the entire system achieves translation.

Figure 6:
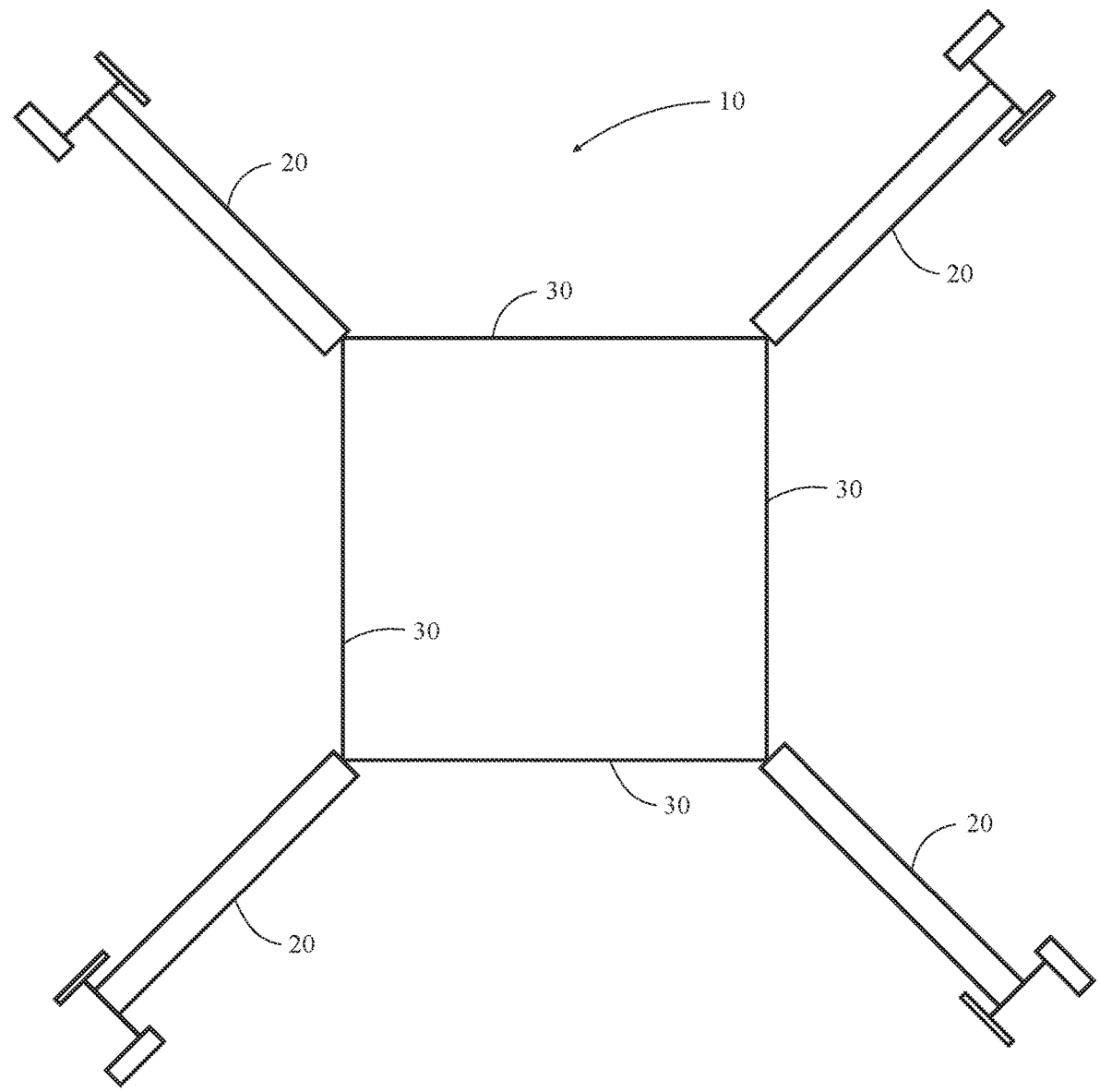
FIG. 6 is a perspective view of a satellite vehicle with additional vertical and horizontal control surfaces according to selected embodiments of the current disclosure.

While a single propulsion unit and a single elevator is sufficient to achieve the coordinated maneuvers needed by the central hub, FIG. 6 illustrates how additional stabilizers and control surfaces may be employed by the tethered uni-rotor network. A horizontal control surface 26 mounted on the fuselage and aligned with the quarter chord of the wing, would provide a vertical force on the satellite vehicle. This control input could independently adjust the relative vertical position of the satellite vehicle without altering its pitch angle. Similarly, a vertical control surface 27 mounted on the fuselage and aligned with the quarter chord of the wing, would provide a radial force which increases or decreases the tension on the tether. When applied cyclically, this control input could induce horizontal translation within the central hub, without requiring cyclic throttle commands for an advancing/retreating rotor blade control approach. Similarly, angle stabilizers and control surfaces may be used to reduce the number of surfaces, but will generally require a more complicated control mixing strategy.

Each satellite vehicle needs a propulsion unit, which counteracts aerodynamic drag acting on the body, while keeping the tethered uni-rotor network aircraft in a state of rotation. A preferred embodiment uses fixed pitch propellers with brushless electric motor systems, because of its simplicity. Other means of propulsion units are also acceptable. Variable pitch propellers could replace or compliment fixed pitch propellers, to provide a faster dynamic response. Various fuel sources; like heavy fuel, fuel cells, or hybrid systems; could replace or compliment an electric power supply. Or a propeller methodology could be completely omitted, and jet or rocket systems could be elected to provide thrust for each satellite vehicle.

Figure 7:
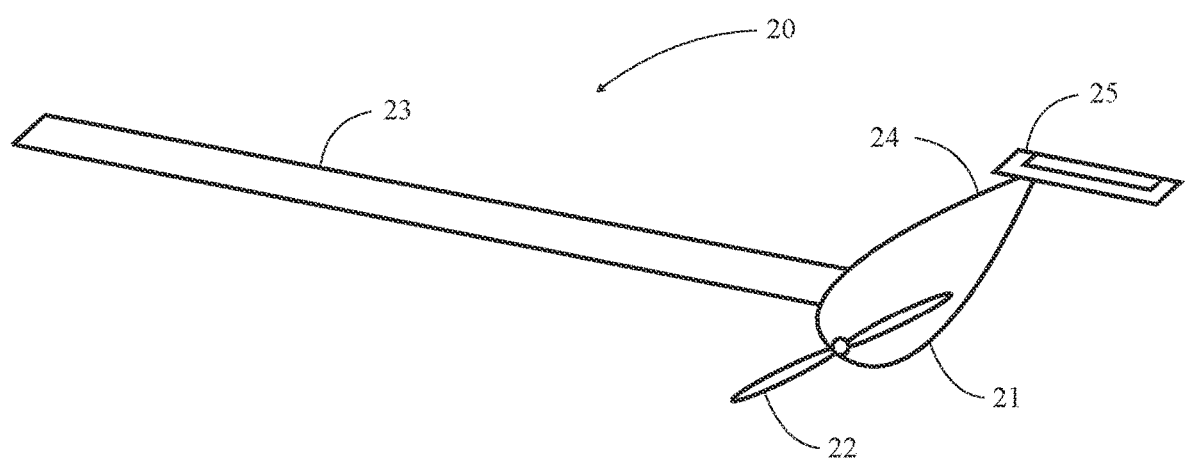
FIG. 7 is a perspective view of a satellite vehicle with a gimbal or articulated propulsion unit according to selected embodiments of the current disclosure.

FIG. 7 is a perspective view of a satellite vehicle with a gimbal or articulated propulsion unit according to selected embodiments of the current disclosure. The fuselage 21 includes a gimbal or joint 28 that supports the propulsion unit 22, in this embodiment it is a propeller. The propulsion unit 22 rotates in various directions and in one or more axes 29 relative to the satellite vehicle 20 via the gimbal or joint 28. The various directions of the propulsion unit alters the direction of thrust which acts on the satellite vehicle 20, and produces a moment that can be used as a control input. Additional degrees of freedom within the propulsion unit mechanism may be used to reduce the number of stabilizers, control surfaces, or both.

Figure 8:
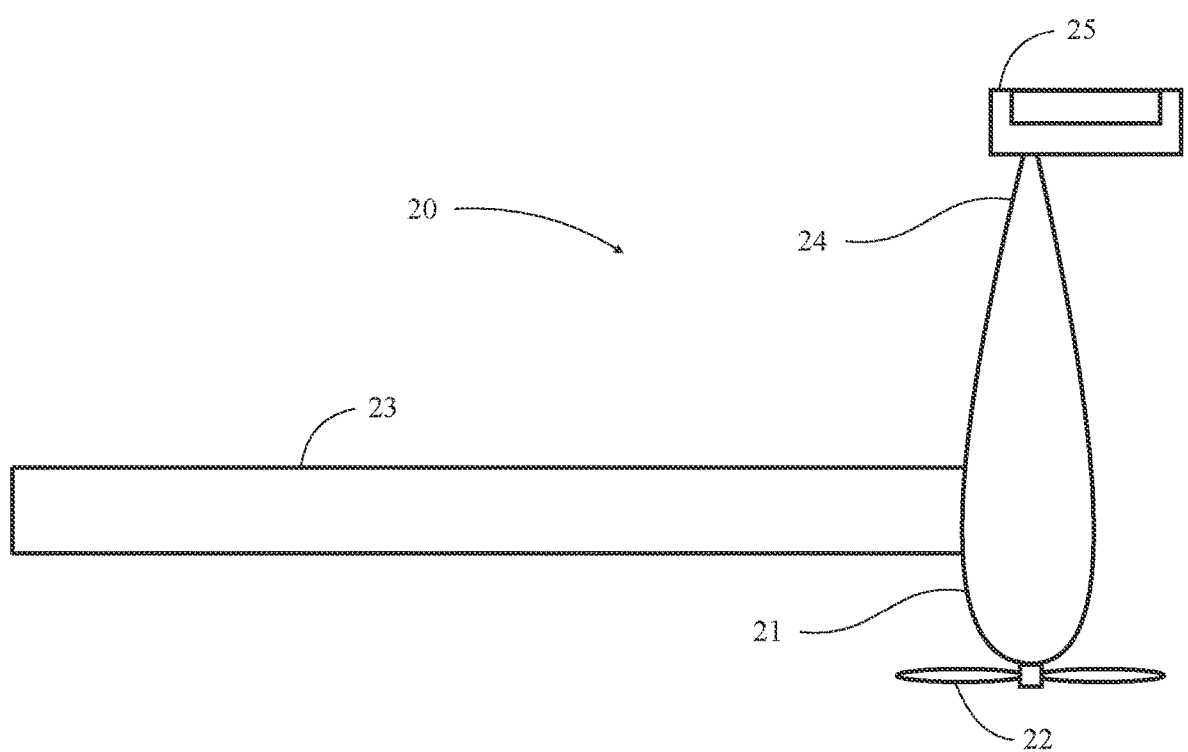
FIG. 8 depicts several perspective views of satellite vehicles utilizing different forms of differential thrust according to selected embodiments of the current disclosure.

FIG. 8 showcases the application of differential thrust according to selected embodiments of the current disclosure. Differential thrust is a control mixing strategy which adjusts multiple motors off of their nominal control inputs, to impart a moment on the system while maintaining the same net force between all the propulsion units. This technique can be used to reduce the number of control surfaces needed. FIG. 8A has two propulsion units 22, mounted on both wingtips of a satellite vehicle, such that simultaneously increasing/decreasing these two motors produces a yaw moment. FIG. 8B has two propulsion units 22, both located at the outboard wingtip, with one above and one below the wing plane, such that simultaneously increasing/decreasing these two motors produces a pitch moment. FIG. 8C shows a pair of coaxial propulsion units 22, both located at the outboard wingtip, but spinning in opposite directions, such that simultaneously increasing/decreasing these two motors changes the resultant motor torques, and produces a roll moment on the satellite vehicle. Implementing differential thrust does not require pairs of exactly two propulsion units. Those skilled in the art, will appreciate that suitable control mixing can achieve similar results from any number of multiple propulsion units within a wide variety of arrangements.

Figure 9:
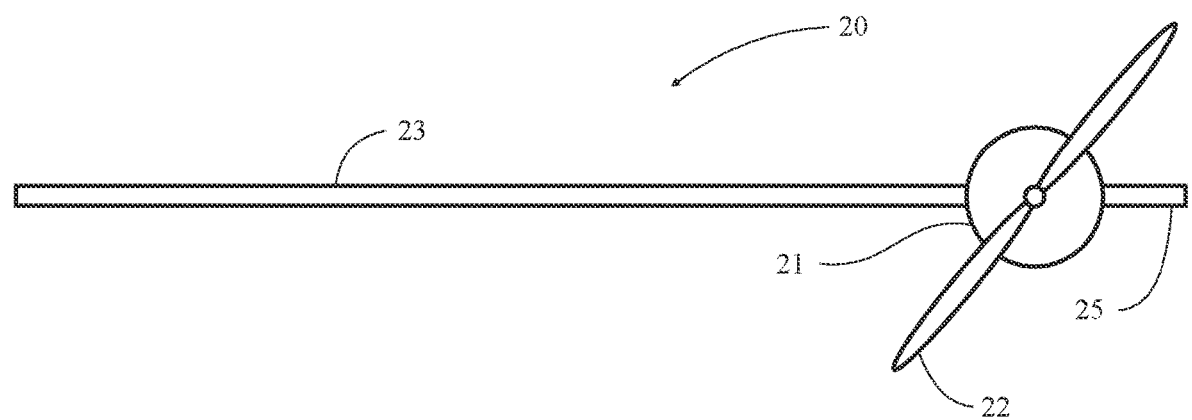
FIG. 9 is a front view of a satellite vehicle with a plurality of propulsion units distributed across the wingspan according to selected embodiments of the current disclosure.

FIG. 9 is a front view of a satellite vehicle with a plurality of propulsion units according to selected embodiments of the current disclosure. Many propulsion units 22 mounted onto their respective fuselages 21 are distributed across the leading edge of the winged lifting surface 23 of the satellite vehicle 20. This configuration applies forced air over the airfoil which may lead to better laminar flow over the wing surface. However, these additional propulsion units represent an engineering tradeoff that must be evaluated against any extra weight and manufacturing complexity.

Figure 10:
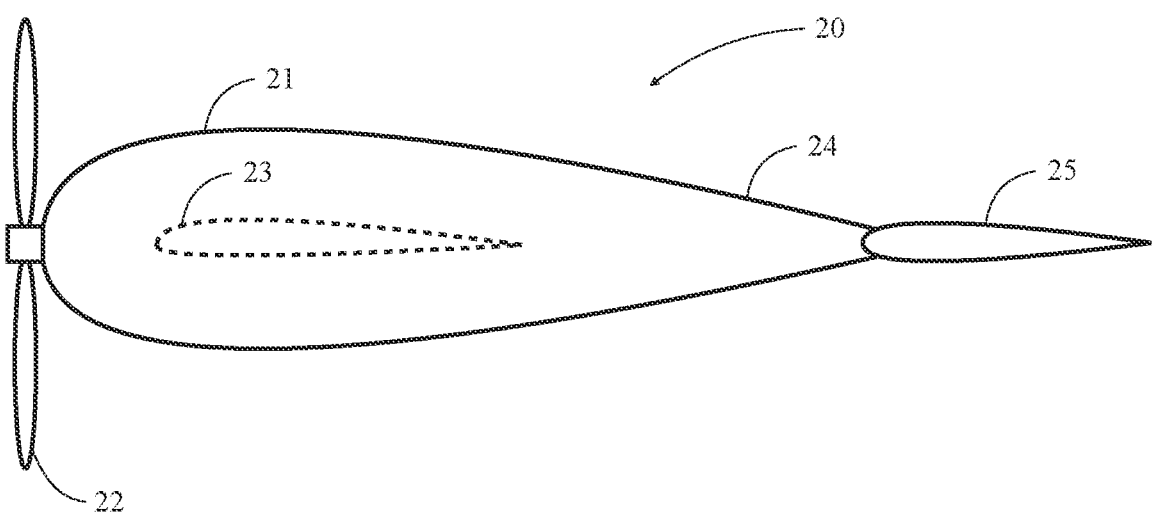
FIG. 10 is a side view of a satellite vehicle according to selected embodiments of the current disclosure.

FIG. 7 is a perspective view, FIG. 8 is a top view, FIG. 9 is a front view, and FIG. 10 is a side view, of a satellite vehicle according to selected embodiments of the current disclosure. The satellite vehicle 20 has fuselages 21, in this embodiment there is one, which has a propulsion unit 22, in this embodiment it is a propeller, to generate thrust. A lifting surface 23, such as a wing, provides lift, which is a generally upward force. A tail boom 24, extending aft of the fuselage, secures a horizontal stabilizer with an elevator 25, which provides pitch control for the satellite vehicle 20. As shown in this figure, the satellite vehicle employs an asymmetrical mono-wing design, with a prop located on the outboard wingtip, and control surfaces located within the prop wash. As will be appreciated by those skilled in the art, other positions, locations, orientations, or geometries of the lifting surfaces, stabilizers, control surfaces, or propulsion units, may be used to control the satellite vehicles.

The satellite vehicle configuration depicted within the previous four figures is considered to be the ideal embodiment of the current disclosure. A single propulsion unit on each satellite system is the minimum number needed to overcome aerodynamic drag. Mounting the propulsion unit on the outboard wingtip provides the most centrifugal benefit, but inboard or middle placements are conceivable as well. Since each satellite vehicle is subjected to centrifugal force, the roll and yaw axes of each satellite vehicle are asymptotically stable. Thus, a single horizontal stabilizer with elevator control surface, is the bare minimum needed to provide active pitch control and stabilization. Later paragraphs will outline how additional stabilizers and control surfaces may be used within the design.

Figure 11:
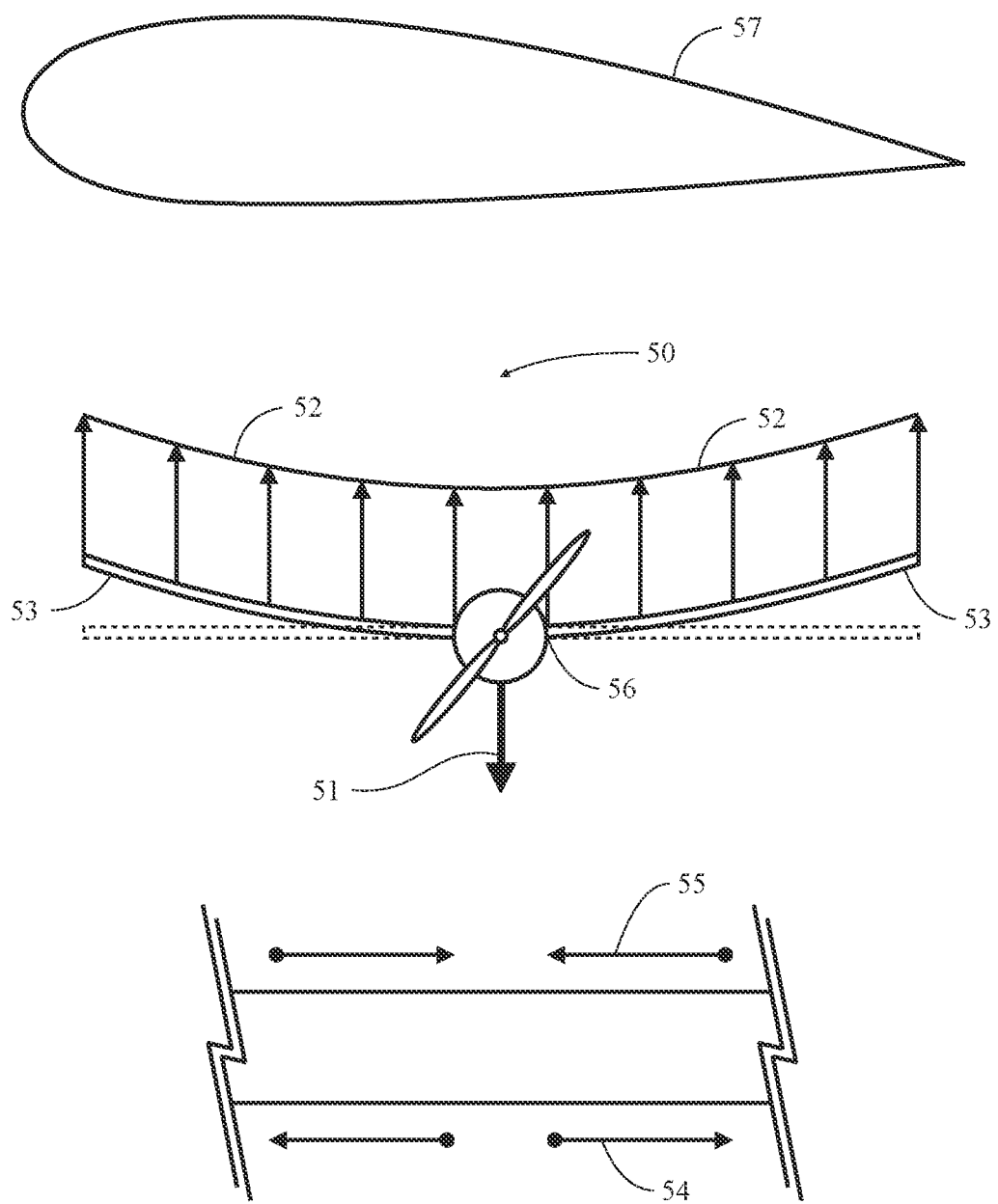
FIG. 11 is an illustration which shows a front view of a traditional fixed-wing aircraft, and its resultant bending moment across the wing.

FIG. 11 is a diagram which illustrates the bending moment within traditional fixed-wing aircraft. A traditional aircraft 50 has a weight force 51 located at the center of gravity, and a lift force 52 distributed across its wing. These forces tend to deflect the wing and its structural members, which puts the bottom surface under tension 54 while the top surface is subjected to compression 55. Many materials, especially those with carbon fiber composites, perform significantly better under tension than under compression. As such, the wing root 56, which is the connection point between the wing and the fuselage, requires additional structural material, and the wing profile 57 must have a suitable thickness to overcome this compression force arising from the bending moment.

Figure 12:
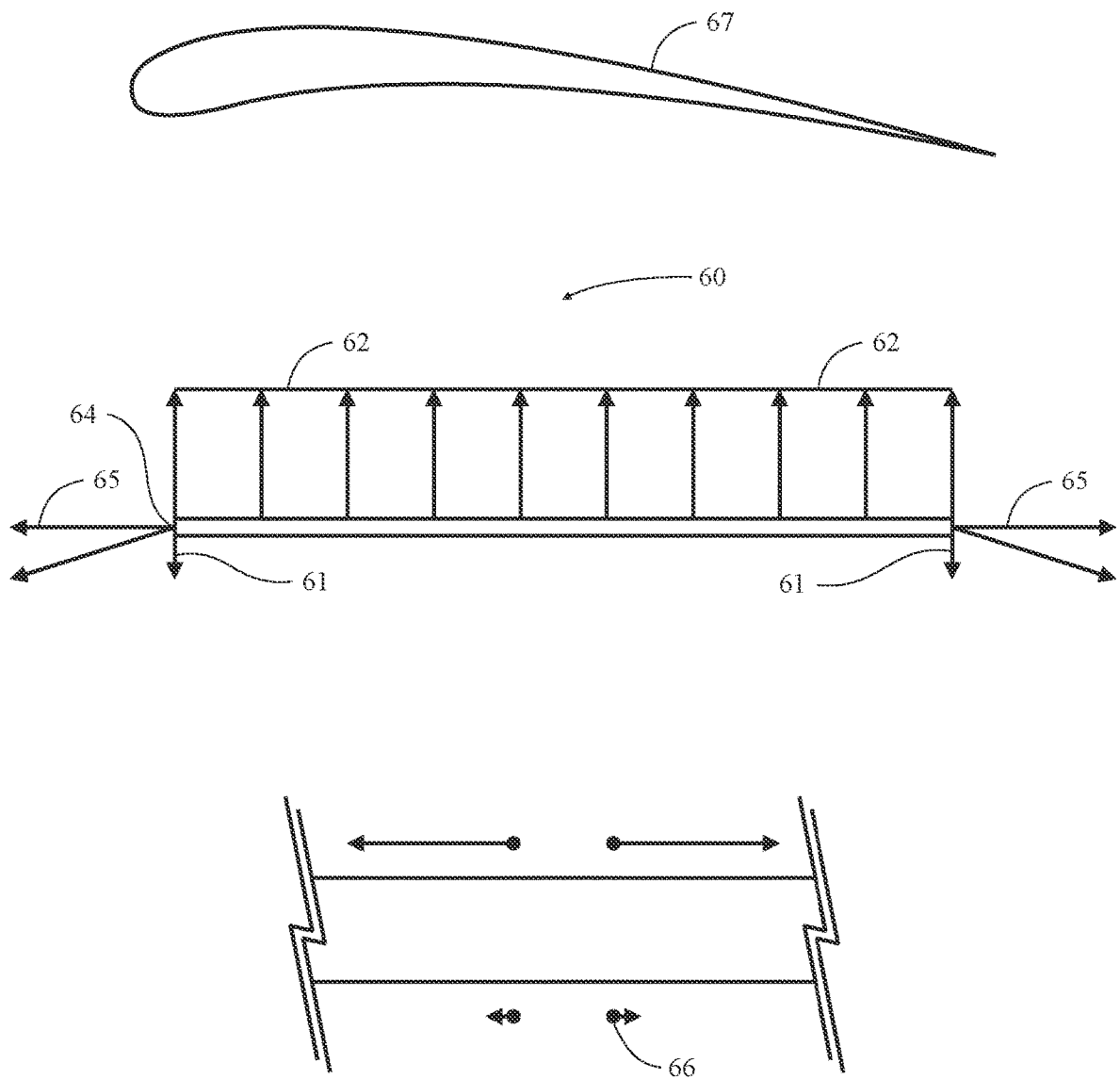
FIG. 12 is an illustration which shows how centrifugal stiffening alleviates a bending moment across the structural member of a wing according to selected embodiments of the current disclosure.

FIG. 12 is a diagram which illustrates how the tethered uni-rotor network system, disclosed herein, has the same beneficial centrifugal stiffening as a traditional helicopter rotor, to overcome the structural problems inherent within fixed-wing aircraft. Inboard sections are comprised of a thin tether filament, which eliminates an underutilized structure from a helicopter design. Because the satellite wingtip is free to pivot about the tether connection point 64, there is no detrimental bending moment which is typically found at the wing root of fixed-wing aircraft designs. Weight 61 still acts downward, and the lift force 62 is still distributed across the wing, but with the tethered uni-rotor network approach, there is also centrifugal force 65 pulling the wing and its structural members under tension. As such, the centrifugal stiffening within each satellite vehicle can offset the compression loads and place the entire structural member under tension 66. This reduces the total mass of the structural member, allows for much greater aspect ratios than can be attained by a traditional tube-and-wing style aircraft, and permits thin-thickness, high-camber airfoils 67 with much better lift-to-drag ratios than standard practice.

Figure 13:
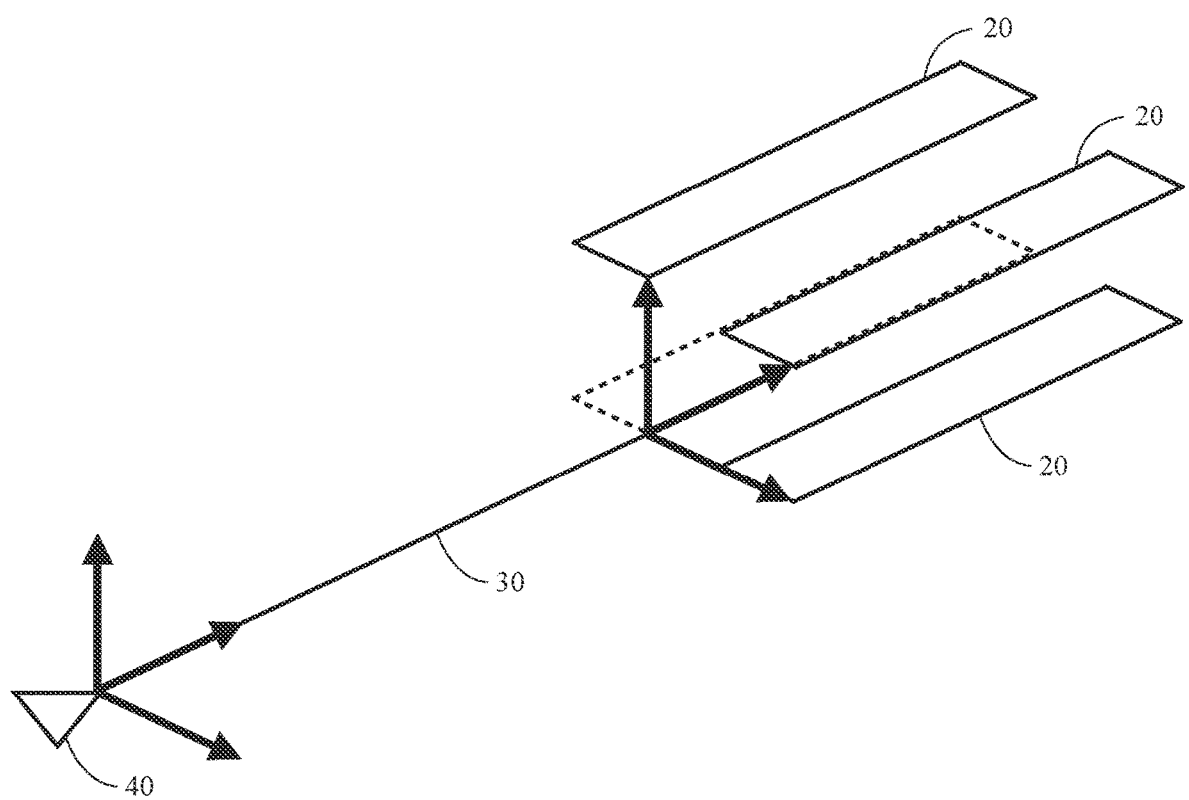
FIG. 13 is a diagram showing the interacting forces transmitted by the tether between the satellite vehicle and the central hub according to selected embodiments of the current disclosure.

FIG. 13 is a diagram showing the interacting forces transmitted through the tether between the satellite vehicle and the central hub according to selected embodiments of the current disclosure. As the system operates in a persistent state of rotation, three components of a force vector act at the connection point on the central hub. A vertical force counteracts the weight of the central hub, a lateral force arises from the aerodynamic drag pulling on the tether, and a radial force arises from the centrifugal forces present from the rotation of the system. These three forces are present even during the hover operation of the tethered uni-rotor network system. However, altering the relative position of a satellite vehicle with respect to the central hub, will also alter the magnitude of the component forces acting on the central hub anchor point. As the satellite vehicle 20 moves away from the central hub 40, the satellite vehicle 20 pulls on the tether 30, which in turn increases the magnitude of the radial force on the central hub 40. Similarly, moving inward decreases the magnitude of the vector. As the satellite vehicle 20 moves upward with respect to the central hub 40, the satellite vehicle 20 pulls upward on the tether 30, which in turn increases the magnitude of the vertical force on the central hub 40. Similarly, moving downward decreases the magnitude of the vector. As the satellite vehicle 20 moves forward with respect to the central hub 40, the satellite vehicle 20 pulls forward on the tether 30, which in turn increases the magnitude of the lateral force on the central hub 40. Similarly, moving backward decreases the magnitude of the vector. As long as there is tension within the tether from the rotation of the aerial system, these forces are transferred to the hub, subject to drag and other frictional losses. Although the central hub has no active controls of its own, navigating the tethered uni-rotor network can be accomplished through coordinated flight maneuvers, which impart the desired forces on the central hub, such that the entire system achieves translation. A similar controls methodology may be applied to the tethered uni-rotor network embodiment without a central hub, except the control architecture must monitor the dynamic interactions between the satellite vehicles, rather than forces imparted on a central hub.

Figure 14:
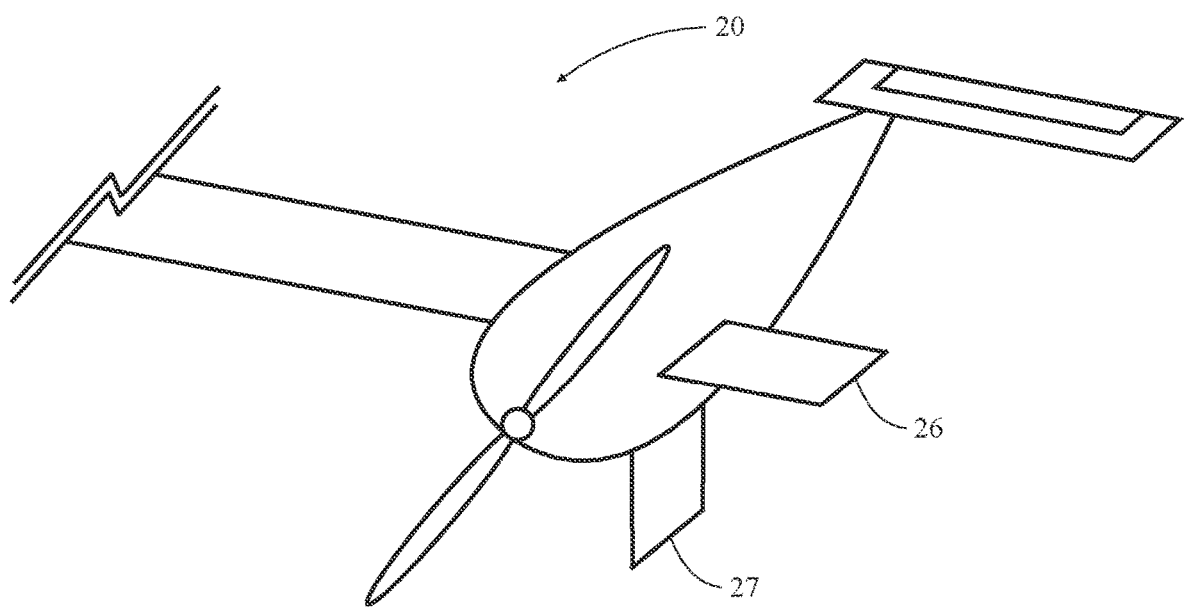
FIG. 14 is a perspective view of a satellite vehicle with additional vertical and horizontal control surfaces according to selected embodiments of the current disclosure.

While a single propulsion unit and a single elevator is sufficient to achieve the coordinated maneuvers needed by the central hub, FIG. 14 illustrates how additional stabilizers and control surfaces may be employed by the tethered uni-rotor network. A horizontal control surface 26 mounted on the fuselage and aligned with the quarter chord of the wing, would provide a vertical force on the satellite vehicle. This control input could independently adjust the relative vertical position of the satellite vehicle without altering its pitch angle. Similarly, a vertical control surface 27 mounted on the fuselage and aligned with the quarter chord of the wing, would provide a radial force which increases or decreases the tension on the tether. When applied cyclically, this control input could induce horizontal translation within the aerial system, without requiring cyclic throttle commands for an advancing/retreating rotor blade control approach. Similarly, angled stabilizers and control surfaces may be used to reduce the number of surfaces, but will generally require a more complicated control mixing strategy.

Each satellite vehicle needs a propulsion unit, which counteracts aerodynamic drag acting on the body, while keeping the tethered uni-rotor network aircraft in a state of rotation. A preferred embodiment uses fixed pitch propellers with brushless electric motors drawing power from one or more battery systems, because of its simplicity. Other means of propulsion units are also acceptable. Variable pitch propellers could replace or compliment fixed pitch propellers, to provide a faster dynamic response. A swashplate design, common within traditional helicopters, could provide torque commands in addition to the primary thrust force. Various fuel sources; like traditional aviation liquid fuel, fuel cells, or hybrid power systems; could replace or compliment an electric power supply. Or a propeller methodology could be completely omitted, and jet or rocket systems could be elected to provide thrust for each satellite vehicle.

Figure 15:
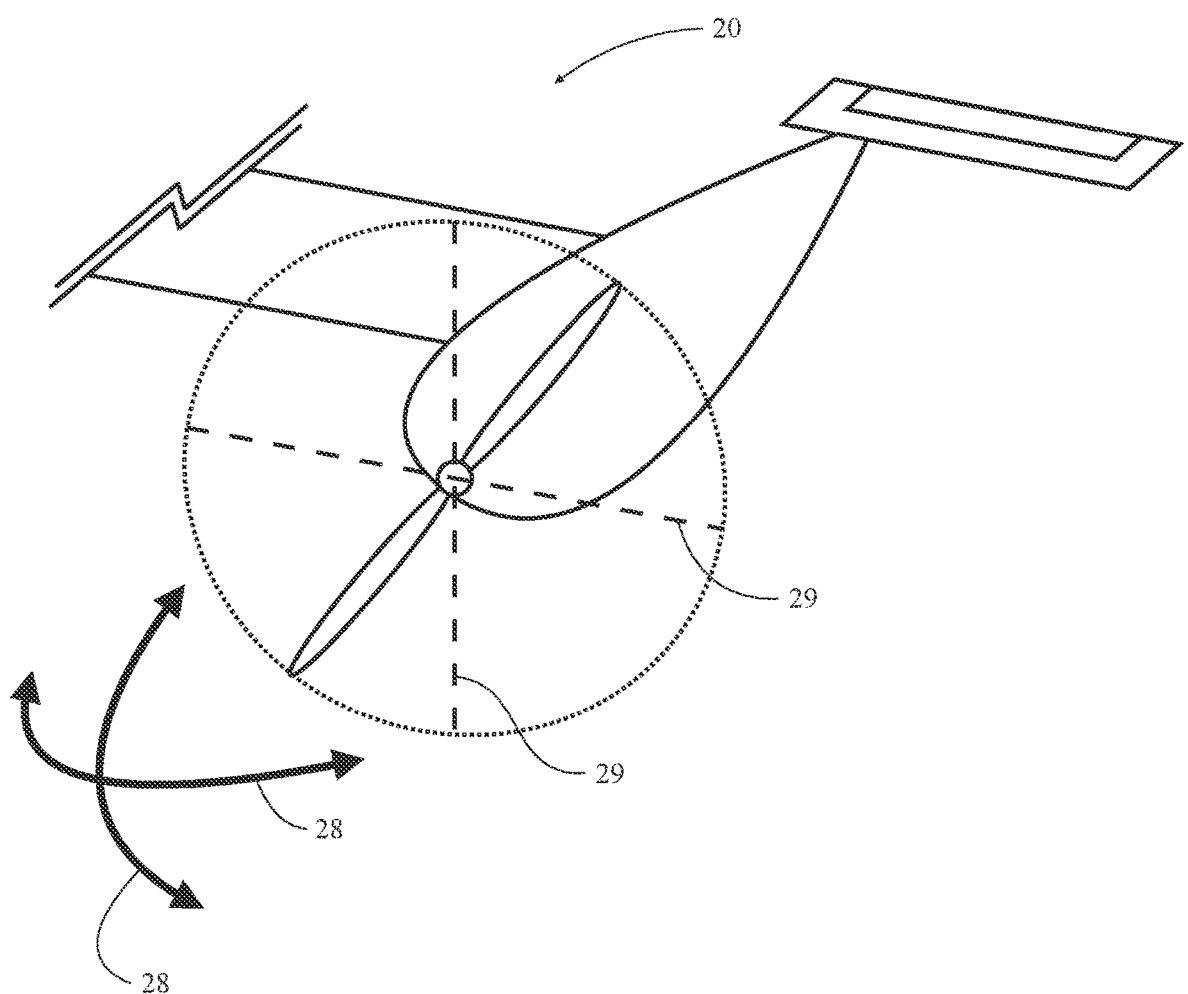
FIG. 15 is a perspective view of a satellite vehicle with a gimbal or articulated propulsion unit according to selected embodiments of the current disclosure.

FIG. 15 is a perspective view of a satellite vehicle with a gimbal or articulated propulsion unit according to selected embodiments of the current disclosure. The fuselage 21 includes one or more gimbals or hinge joints 29 that support the propulsion unit 22, in this embodiment it is a propeller. The propulsion unit 22 rotates in various directions and in one or more axes 28 relative to the satellite vehicle 20 via the gimbals or hinge joints 29. The various directions of the propulsion unit alters the direction of thrust which acts on the satellite vehicle 20, and produces a moment that can be used as a control input. Degrees of freedom within the propulsion unit mechanism may reduce the number of stabilizers, control surfaces, or both.

Figure 16:
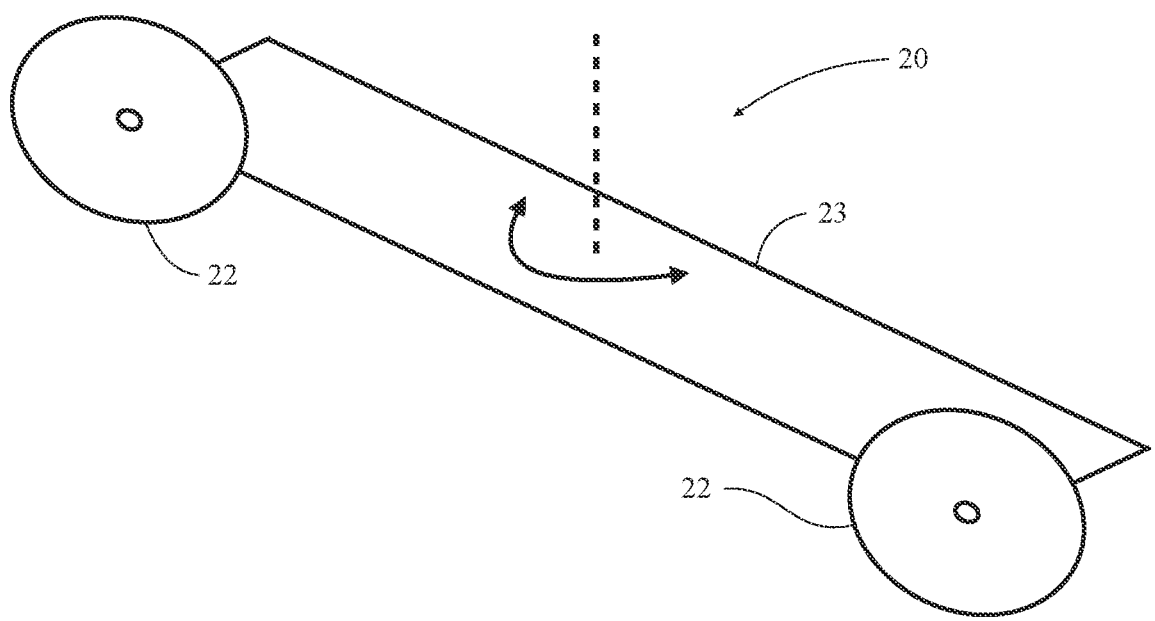
FIG. 16 depicts a perspective view of a satellite vehicle employing differential thrust for yaw control according to selected embodiments of the current disclosure.
Figure 17:
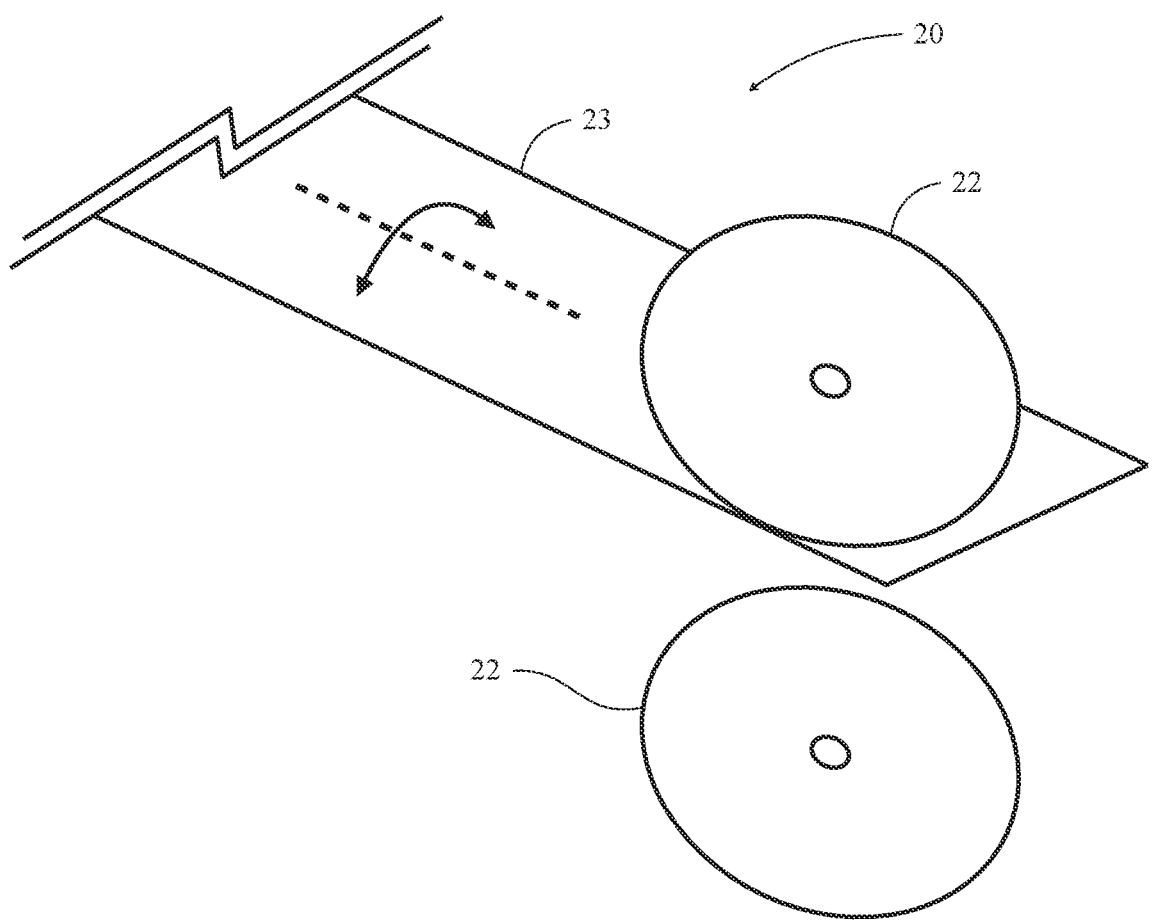
FIG. 17 depicts a perspective view of a satellite vehicle employing differential thrust for pitch control according to selected embodiments of the current disclosure.
Figure 18:
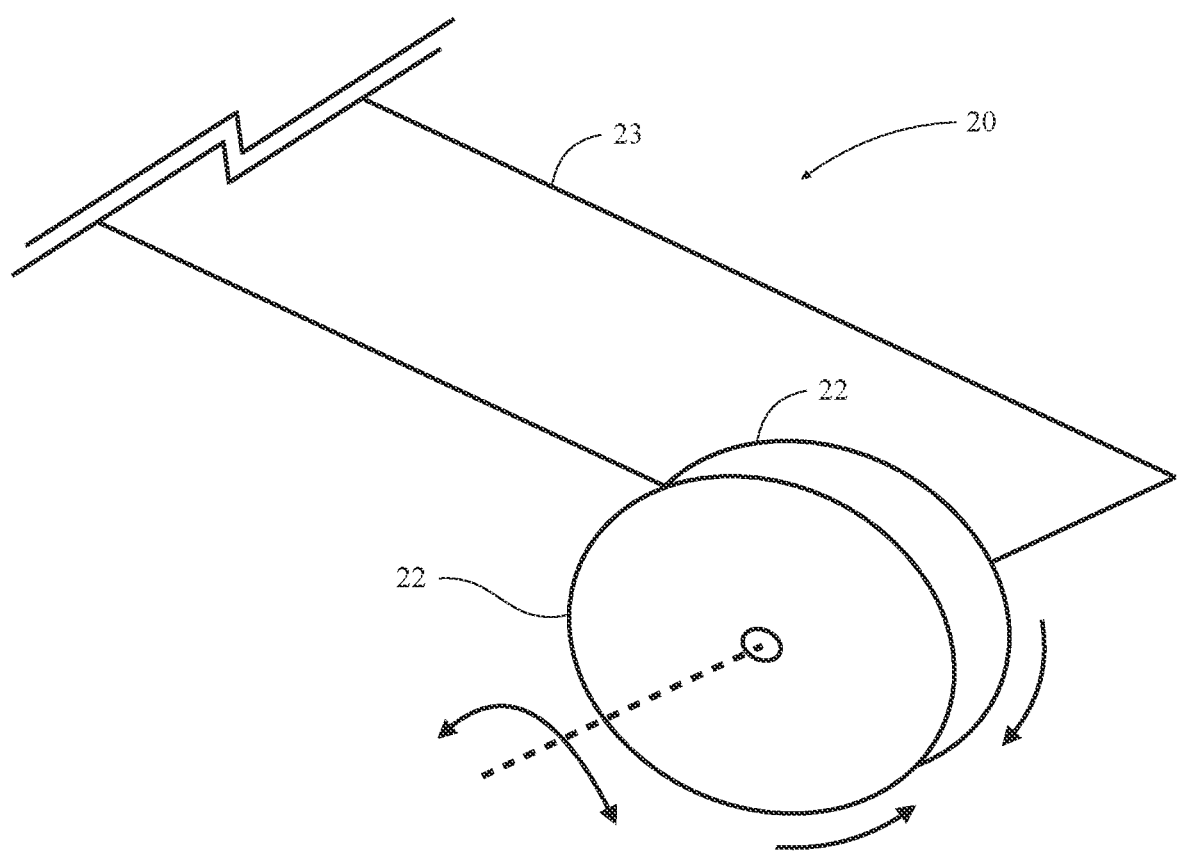
FIG. 18 depicts a perspective view of a satellite vehicle employing differential thrust for roll control according to selected embodiments of the current disclosure.

The next three figures showcase the application of differential thrust according to selected embodiments of the current disclosure. Differential thrust is a control mixing strategy which adjusts multiple motors off of their nominal control inputs, to impart a moment on the system while maintaining the same net force between all the propulsion units. This technique can be used to reduce the number of control surfaces needed. FIG. 16 has two propulsion units 22, mounted on both wingtips of a satellite vehicle, such that simultaneously increasing/decreasing these two motors produces a yaw moment. FIG. 17 has two propulsion units 22, both located at the outboard wingtip, with one above and one below the wing plane, such that simultaneously increasing/decreasing these two motors produces a pitch moment. FIG. 18 shows a pair of coaxial propulsion units 22, both located at the outboard wingtip, but spinning in opposite directions, such that simultaneously increasing/decreasing these two motors changes the resultant motor torques, and produces a roll moment on the satellite vehicle. Implementing differential thrust does not require pairs of exactly two propulsion units aligned with any specific axis. Those skilled in the art, will appreciate that suitable control mixing can achieve similar results from any number of multiple propulsion units within a wide variety of layout arrangements.

Figure 19:
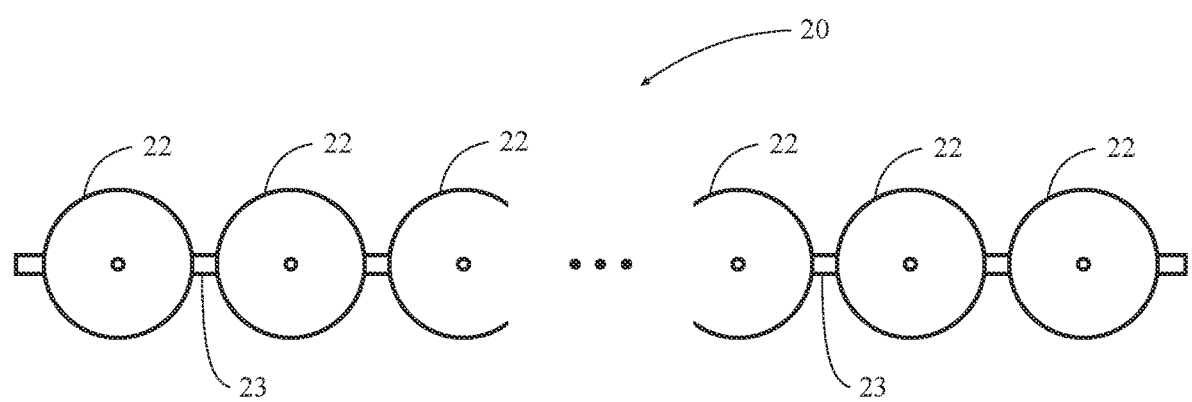
FIG. 19 is a front view of a satellite vehicle with a plurality of propulsion units distributed across the wingspan according to selected embodiments of the current disclosure.

FIG. 19 is a front view of a satellite vehicle with a plurality of propulsion units according to selected embodiments of the current disclosure. Many propulsion units 22 mounted onto their respective fuselages 21 are distributed across the leading edge of the winged lifting surface 23 of the satellite vehicle 20. This configuration applies forced air over the airfoil which may lead to better laminar flow over the wing surface. However, these additional propulsion units represent an engineering tradeoff that must be evaluated against any extra weight and manufacturing complexity.

Embodiments of the current disclosure provide for an aerial system with multiple tether arms. One arm is not a valid configuration because there is no means of counter balancing the rotation. Two arms are able to counter balance one another, but the central hub is free to swing like a hammock. Thus, this configuration should only be used as a means of recovering a vehicle, should the other tether arms become disabled, or as part of a system that constrains the central hub in other ways, like the primary tether on an airborne wind energy device. Three arms are the minimum number needed to achieve stability within the central hub, and is a preferable number in terms of aerodynamic efficiency, because it provides the most concentrated weight to provide the most centrifugal force per satellite vehicle. The disadvantage is that, for an odd number of tether arms, horizontal translation is more difficult to control, because pairs of tether arms are not directly opposite one another. Four arms have slightly less ideal centrifugal stiffening than three arms, but it is easier to implement horizontal translation because pairs of tethers are directly opposed to one another. Five or more arms are all physically possible, and could be used to carry larger payloads within the central hub, or to add redundancy and robustness to the system as a safety measure, but adding more arms increases complexity and compromises the amount of centrifugal stiffening within each tether arm.

It should be understood that while the preferred embodiments of the invention are described in some detail herein, the present disclosure is made by way of example only. Variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed is:

1. An aerial system comprising:
a central hub, two or more satellite vehicles, and tethers which secure each satellite vehicle to the central hub, which radiate outward in a hub-and-spoke arrangement;
where the aerial system always operates in a state of rotation;
where the central hub is a permanent member of the aerial system;
where the central hub rotates with the aerial system;
where each satellite vehicle comprises one or more wings to generate lift;
where one or more of the wings comprises one or more structural members to maintain the rigidity of the wing;
where each tether attaches to an inboard portion of the wing on each satellite vehicle;
where the energy storage mass is located near the outboard portion of each satellite vehicle;
where each satellite vehicle utilizes an asymmetrical layout;
where each satellite vehicle has one or more propulsion units;
where each satellite vehicle has a means of controlling its trajectory, through one or more of the following:
(a) one or more of the propulsion units orients one or more of the thrust vectors relative to the satellite vehicle as a means of controlling each satellite vehicle, or
(b) two or more of the propulsion units employ differential thrust as a means of controlling each satellite vehicle, or
(c) one or more stabilizers are used to stabilize the trajectory of each satellite vehicle, or
(d) one or more control surfaces are used as a means of controlling the trajectory of each satellite vehicle;
such that, the rotation of the aerial system subjects each satellite vehicle to a centrifugal force;
such that, the location of each tether connected to the inboard portion of the wing, and an energy storage mass located at the outboard portion of each satellite vehicle, places the one or more wings under tension;
such that, a bending moment is alleviated within each structural member by reducing or eliminating the compression acting on each structural member;
such that, abating compression from within the structural members, requires less structural material, and permits higher aspect ratio wings, than those that do not utilize centrifugal stiffening.

2. An aerial system comprising:
a central hub, two or more satellite vehicles, and tethers which secure each satellite vehicle to the central hub, which radiate outward in a hub-and-spoke arrangement;
where each satellite vehicle comprises one or more wings to generate lift;
where one or more of the wings comprises one or more structural members to maintain the rigidity of the wing;
where each satellite vehicle has one or more propulsion units;
where each satellite vehicle has a means of controlling its trajectory;
such that, the rotation of the aerial system subjects each satellite vehicle to a centrifugal force;
such that, the one or more wings are placed under tension;
such that, a bending moment is alleviated within each structural member by reducing or eliminating the compression acting on each structural member;
such that, abating compression from within the structural members, requires less structural material, and permits higher aspect ratio wings, than those that do not utilize centrifugal stiffening.

3. The aerial system of claim 2, wherein the aerial system always operates in a state of rotation.

4. The aerial system of claim 2, wherein the central hub is a permanent member of the aerial system.

5. The aerial system of claim 2, wherein the central hub rotates with the aerial system.

6. The aerial system of claim 2, wherein each tether attaches to an inboard portion of the wing on each satellite vehicle.

7. The aerial system of claim 2, wherein the energy storage mass is located near the outboard portion of each satellite vehicle.

8. The aerial system of claim 2, wherein each satellite vehicle utilizes an asymmetrical layout.

9. The aerial system of claim 2, wherein the central hub is a permanent member of the aerial system, and the central hub always rotates with the aerial system.

10. The aerial system of claim 2, wherein each tether attaches to an inboard portion of the wing on each satellite vehicle, and the energy storage mass is located near the outboard portion of each satellite vehicle.

11. The aerial system of claim 2, wherein the aerial system always operates in a state of rotation, and each satellite vehicle utilizes an asymmetrical layout.

12. The aerial system of claim 2, wherein the aerial system always operates in a state of rotation, the central hub is a permanent member of the aerial system, and the central hub always rotates with the aerial system.

13. The aerial system of claim 2, wherein each satellite vehicle utilizes an asymmetrical layout, such that each tether attaches to an inboard portion of the wing on each satellite vehicle, and the energy storage mass is located near the outboard portion of each satellite vehicle.

14. The aerial system of claim 2, wherein the aerial system always operates in a state of rotation, the central hub is a permanent member of the aerial system, the central hub always rotates with the aerial system, and each satellite vehicle utilizes an asymmetrical layout, such that each tether attaches to an inboard portion of the wing on each satellite vehicle, and the energy storage mass is located near the outboard portion of each satellite vehicle.

15. The aerial system of claim 2, wherein one or more of the propulsion units orient one or more of the thrust vectors relative to the satellite vehicle as a means of controlling each satellite vehicle.

16. The aerial system of claim 2, wherein two or more of the propulsion units employ differential thrust as a means of controlling each satellite vehicle.

17. The aerial system of claim 2, wherein one or more stabilizers are used to stabilize the trajectory of each satellite vehicle.

18. The aerial system of claim 2, wherein one or more control surfaces are used as a means of controlling the trajectory of each satellite vehicle.

19. The aerial system of claim 2, wherein each satellite vehicle controls its trajectory with a combination of thrust vectoring, differential thrust, stabilizers, and/or control surfaces.

20. The aerial system of claim 2, wherein the aerial system always operates in a state of rotation, the central hub is a permanent member of the aerial system, the central hub always rotates with the aerial system, each satellite vehicle controls its trajectory with a combination of thrust vectoring, differential thrust, stabilizers, and/or control surfaces, and each satellite vehicle utilizes an asymmetrical layout, such that each tether attaches to an inboard portion of the wing on each satellite vehicle, and the energy storage mass is located near the outboard portion of each satellite vehicle.

* * * * *